(12) United States Patent
Tickoo et al.

(10) Patent No.: US 10,635,573 B2
(45) Date of Patent: Apr. 28, 2020

(54) AUTO-GENERATED MULTIPLE INPUT VARIANTS

(71) Applicant: SAP SE, Walldorf (DE)

(72) Inventors: Vipul Tickoo, Haryana (IN); Harshpreet Singh, Delhi (IN); Shweta Goyal, Karnataka (IN)

(73) Assignee: SAP SE, Walldorf (DE)

( * ) Notice: Subject to any disclaimer, the term of this patent is extended or adjusted under 35 U.S.C. 154(b) by 1 day.

(21) Appl. No.: 15/979,856

(22) Filed: May 15, 2018

(65) Prior Publication Data

US 2019/0354465 A1 Nov. 21, 2019

(51) Int. Cl.
*G06F 11/36* (2006.01)

(52) U.S. Cl.
CPC ...... *G06F 11/3664* (2013.01); *G06F 11/3688* (2013.01)

(58) Field of Classification Search
None
See application file for complete search history.

(56) References Cited

U.S. PATENT DOCUMENTS

| | | | | |
|---|---|---|---|---|
| 5,761,408 A * | 6/1998 | Kolawa | | G06F 11/3676 714/38.1 |
| 5,784,553 A * | 7/1998 | Kolawa | | G06F 11/3676 714/38.1 |
| 6,604,136 B1 * | 8/2003 | Chang | | G06F 9/54 709/223 |
| 7,603,658 B2 * | 10/2009 | Subramanian | | G06F 11/3664 717/124 |
| 9,965,379 B1 * | 5/2018 | Hariharan | | G06F 11/3684 |
| 2003/0208744 A1 * | 11/2003 | Amir | | G06F 11/3684 717/124 |
| 2016/0283364 A1 * | 9/2016 | Raghavan | | G06F 11/3692 |
| 2017/0228310 A1 * | 8/2017 | Edwards | | G06F 11/3684 |
| 2018/0039565 A1 * | 2/2018 | Rajagopalan | | G06F 11/3676 |
| 2018/0081730 A1 * | 3/2018 | Duttagupta | | G06F 11/3457 |
| 2018/0357154 A1 * | 12/2018 | Dolby | | G06F 11/3664 |
| 2019/0095318 A1 * | 3/2019 | Bahrami | | G06N 5/047 |

(Continued)

OTHER PUBLICATIONS

Hoffman, "Tools and Techniques for Java API Testing", 2000, IEEE (Year: 2000).*

*Primary Examiner* — Hossain M Morshed
(74) *Attorney, Agent, or Firm* — Buckley, Maschoff & Talwalkar LLC

(57) ABSTRACT

A method and system including a display; at least one application programming interface (API) including one or more parameters, wherein the API communicates with a code of a system under test; a code testing module including a multiple variant generation and handling module; and a code testing processor in communication with the code testing module and operative to execute processor-executable process steps to cause the system to: receive data identifying the API; display one or more parameters associated with the API; generate, with the multiple variant generation and handling module, one or more variants based on values associated with the one or more parameters; receive the one or more generated variants at a variant injector; inject the one or more generated variants into the code via the API; and execute the code with the one or more injected generated variants. Numerous other aspects are provided.

20 Claims, 10 Drawing Sheets

(56) References Cited

U.S. PATENT DOCUMENTS

2019/0149424 A1\* 5/2019 O'Neill .................. G06F 9/541
                                                    709/224
2019/0196944 A1\* 6/2019 Bhide ................. G06F 11/3664

\* cited by examiner

AUTO-GENERATED MULTIPLE INPUT VARIANTS

BACKGROUND

A software application typically includes numerous lines of code written to perform varied functions. This written code ("code") may be tested to provide the entity writing the code with information about the quality of the software application. Software testing techniques may include executing a program or application with the intent of finding software bugs (e.g., errors or other defects), and verifying that the software product is fit for use. When testing the code via execution of the program or application, test values may be derived and used in the execution thereof, and may be analyzed to find software bugs. However, deriving the various test values manually is very time consuming, and there is a limited capability for testing, as typically only a few lines of code are tested.

Systems and methods are desired which support efficient and robust testing of code.

DETAILED DESCRIPTION

Figure 1:
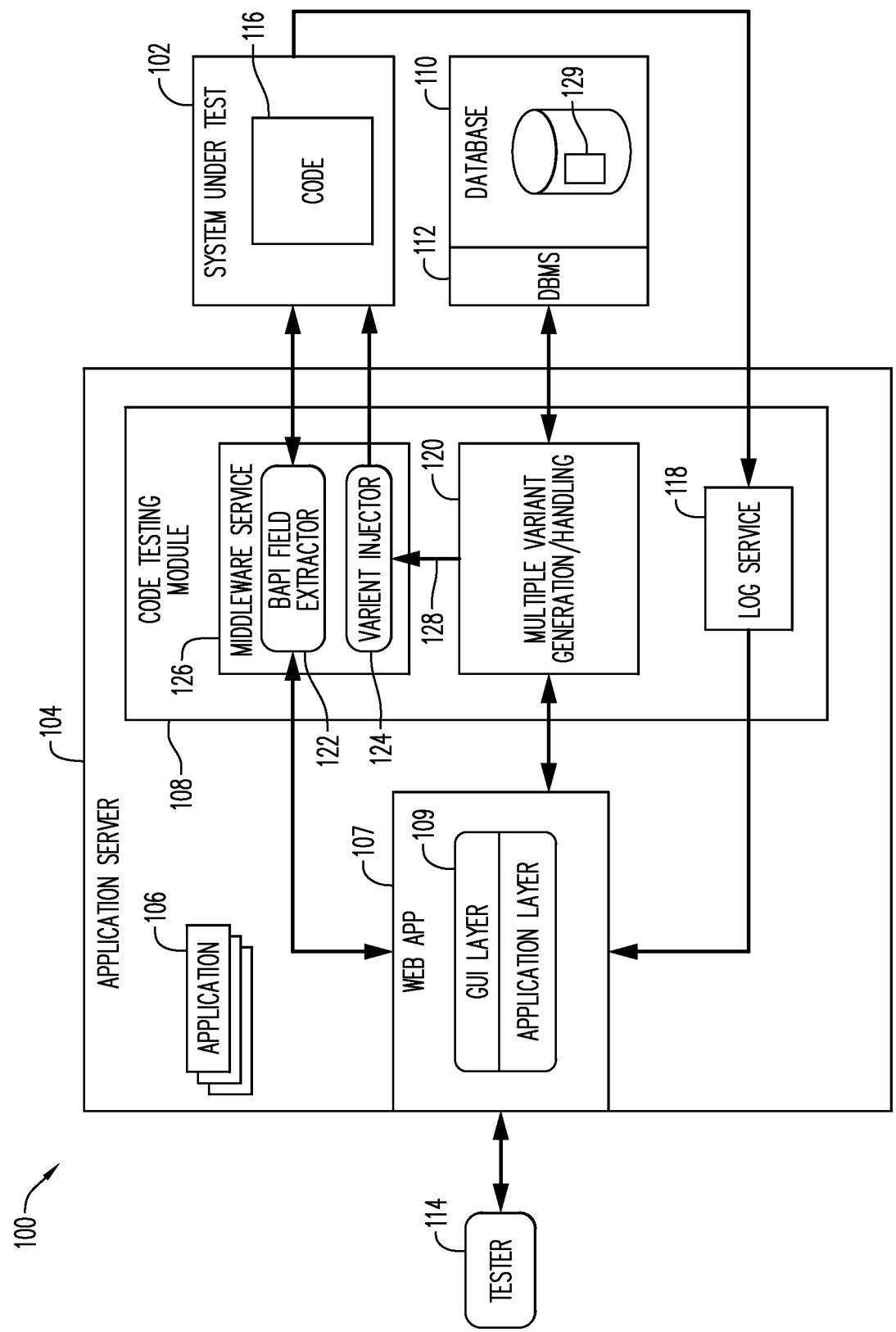
FIG. 1 is a block diagram of a system architecture according to some embodiments.
Figure 2:
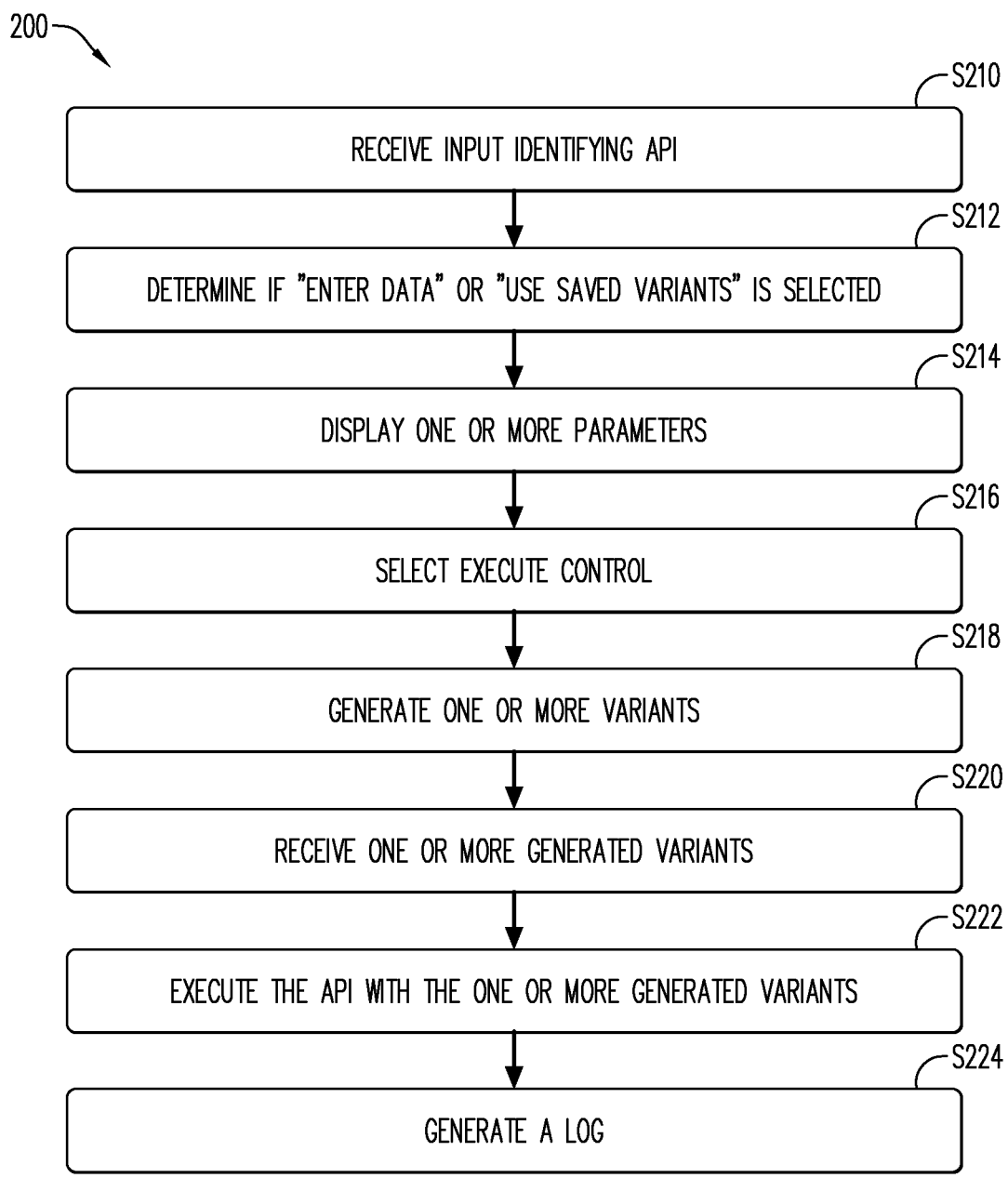
FIG. 2 is a flow diagram of a process according to some embodiments.

The following description is provided to enable any person in the art to make and use the described embodiments and sets forth the best mode contemplated for carrying out some embodiments. Various modifications, however, will remain readily apparent to those in the art.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Software includes numerous lines of code written for performing varied functions. This written code may be broadly categorized as 1. Code written for an application to perform desired functions ("positive scenarios"); and 2. Code written in a form for an application to handle exceptions, field variations, displaying messages and handling errors, etc. ("negative testing"). Testing an application with input data (often invalid) to see how code reacts and whether it triggers correct error messages, exceptions, etc. may be referred to as "negative testing." For example, testing a code with invalid or mismatched input data types may be negative testing.

During development of the software, the code may be tested to determine whether it is functioning as expected, and uncover any software bugs. The testing may be conducted via application programming interfaces (APIs). However, with conventional testing, a fixed set of limited input variables (test data) may be manually passed by a user into the corresponding fields of the API. The small set of available input variables may only stimulate a limited zone of code, thus compromising the ability of the API to reach and hit various lines of code. Additionally, conventionally, each set corresponding to an API may require a separate script to be created and maintained, which is a time-consuming, tedious task.

Embodiments provide a code testing module for the testing of code via an API, and in particular a Business Application Programming Interface (BAPI). The BAPI may include two or more fields that may include data values. These data values may be test values used by the system under test during execution thereof in a test environment to determine how the system is functioning in response to the test values. As such, the BAPI may provide a framework for generating test values by providing parameters used by the code under test. In one or more embodiments the code testing module may include a multiple variant generation and handling module that may generate one or more combinations of test data variants to insert into a code via a BAPI for testing the code. Different values (e.g., alpha-numeric, date validation, special characters, etc.) may be generated in a fraction of the time it would take to manually generate the values, and the values may be systematically and seamlessly injected into the code via a BAPI, testing varied branches of code. One or more embodiments may generate a log that includes each data variant injected in the code for defect analysis, as well as the analysis itself. Additionally, one or more embodiments increase the scope of test coverage, as compared to conventional testing, by targeting increased lines of code.

FIG. 1 is a block diagram of system architecture 100 according to some embodiments. Embodiments are not limited to architecture 100.

Architecture 100 includes a system under test 102, an application server 104, applications 106, a code testing module 108, a database 110, a database management system (DBMS) 112, and tester(s) 114. The system under test 102 may include applications having written code 116 that may comprise server-side executable program code (e.g., compiled code, scripts etc.) executing in the system under test 102 to receive variants 128 from the code testing module 108 and provide results to a log service 118 of the code testing module 108 for analysis by testers 114. The tester may be a developer or a non-developer. In one or more embodiments, the tester 114 may access the code testing module 108 via an application 106, such as a web app 107, executing within application server 104, to generate one or more variants via a multiple variant generation and handling module 120 of the code testing module 108.

The web app 107 may include a graphic user interface layer 109 that may provide a user interface (e.g., FIG. 3) to the tester 114 for display thereof. The user interface may be presented on any type of display apparatus (e.g., desktop monitor, smartphone display, tablet display). Presentation of a user interface as described herein may comprise any degree or type of rendering, depending on the type of user interface code generated by application server 104.

Application server 104 provides any suitable interface through which the tester 114 may communicate with the web app 107 and code testing module 108 or applications 106 executing on application server 104. For example, application server 104 may include a HyperText Transfer Protocol (HTTP) interface supporting a transient request/response protocol over Transmission Control Protocol/Internet Protocol (TCP/IP), a WebSocket interface supporting non-transient full-duplex communications which implement the WebSocket protocol over a single TCP/IP connection, and/or an Open Data Protocol (OData) interface.

For example, the tester 114 may execute a Web Browser to request and receive a Web page (e.g., in HTML format) from a website application 107 of application server 104 via HTTP, HTTPS, and/or WebSocket, and may render and present the Web page according to known protocols. The tester 114 may also or alternatively be presented with user interfaces by executing a standalone executable file (e.g., an .exe file) or code (e.g., a JAVA applet) within a virtual machine.

One or more applications 106/107 executing on server 104 may communicate with the DBMS 112 using database management interfaces such as, but not limited to, Open Database Connectivity (ODBC) and Java Database Connectivity (JDBC) interfaces. Some of these types of applications may use Structured Query Language (SQL) to manage and query data stored in database 110.

DBMS 112 serves requests to retrieve and/or modify data of database 110, and also performs administrative and management functions. Such functions may include snapshot and backup management, indexing, optimization, garbage collection, and/or any other database functions that are or become known. DBMS 112 may also provide application logic, such as database procedures and/or calculations, according to some embodiments. This application logic may comprise scripts, functional libraries and/or compiled program code.

Application server 104 may be separated from, or closely integrated with, DBMS 112. A closely-integrated application server 104 may enable execution of server applications 106/107 completely on the database platform, without the need for an additional application server. For example, according to some embodiments, application server 104 provides a comprehensive set of embedded services which provide end-to-end support for Web-based applications. The services may include a lightweight web server, configurable support for OData, server-side JavaScript execution and access to SQL and SQLScript.

Application server 104 may provide application services (e.g., via functional libraries) which applications 106/107 may use to manage and query the data of database 110. The application services can be used to expose the database data model, with its tables, hierarchies, views and database procedures, to clients. In addition to exposing the data model, application server 104 may host system services such as a search service.

Database 110 may store data used by at least one of: applications 106/107, and the code testing module 108. For example, database 110 may store existing variants 129 that may be used to generate further variants, or may be used directly by the code testing module 108 to inject into the code 116 for testing the system under test 102.

Database 110 may comprise any query-responsive data source or sources that are or become known, including but not limited to a structured-query language (SQL) relational database management system. Database 110 may comprise a relational database, a multi-dimensional database, an eXtendable Markup Language (XML) document, or any other data storage system storing structured and/or unstructured data. The data of database 110 may be distributed among several relational databases, dimensional databases, and/or other data sources. Embodiments are not limited to any number or types of data sources.

In some embodiments, the data of database 110 may comprise one or more of conventional tabular data, row-based data, column-based data, and object-based data. Moreover, the data may be indexed and/or selectively replicated in an index to allow fast searching and retrieval thereof. Database 110 may support multi-tenancy to separately support multiple unrelated clients by providing multiple logical database systems which are programmatically isolated from one another.

Database 110 may implement an "in-memory" database, in which a full database is stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Tester 114 may comprise one or more individuals or devices executing program code of a software application for generating and injecting variants into executable code 116 of the system under test 102.

FIGS. 2-8 include a flow diagram of processes 200 (FIG. 2), 700 (FIG. 7) and 900 (FIG. 9) described with respect to the system 100 and an outward view of user interfaces according to some embodiments. Processes 200/700/900 may be executed by application server 104 according to some embodiments, e.g., by execution of the code testing module 108 to provide one or more variants, and to inject the one or more variants into the code of the system to be tested for execution and analysis thereof. In one or more embodiments, the application server 104 may be conditioned to perform the processes 200/700/900, such that a processor 1010 (FIG. 10) of the server 104 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

User interface 300/400/500/600 may be presented on any type of display apparatus (e.g., desktop monitor, smartphone display, tablet display) provided by any type of device (e.g., desktop system, smartphone, tablet computer). Embodiments are not limited to user interfaces 300/400/500/600 of FIGS. 3-6.

Figure 3:
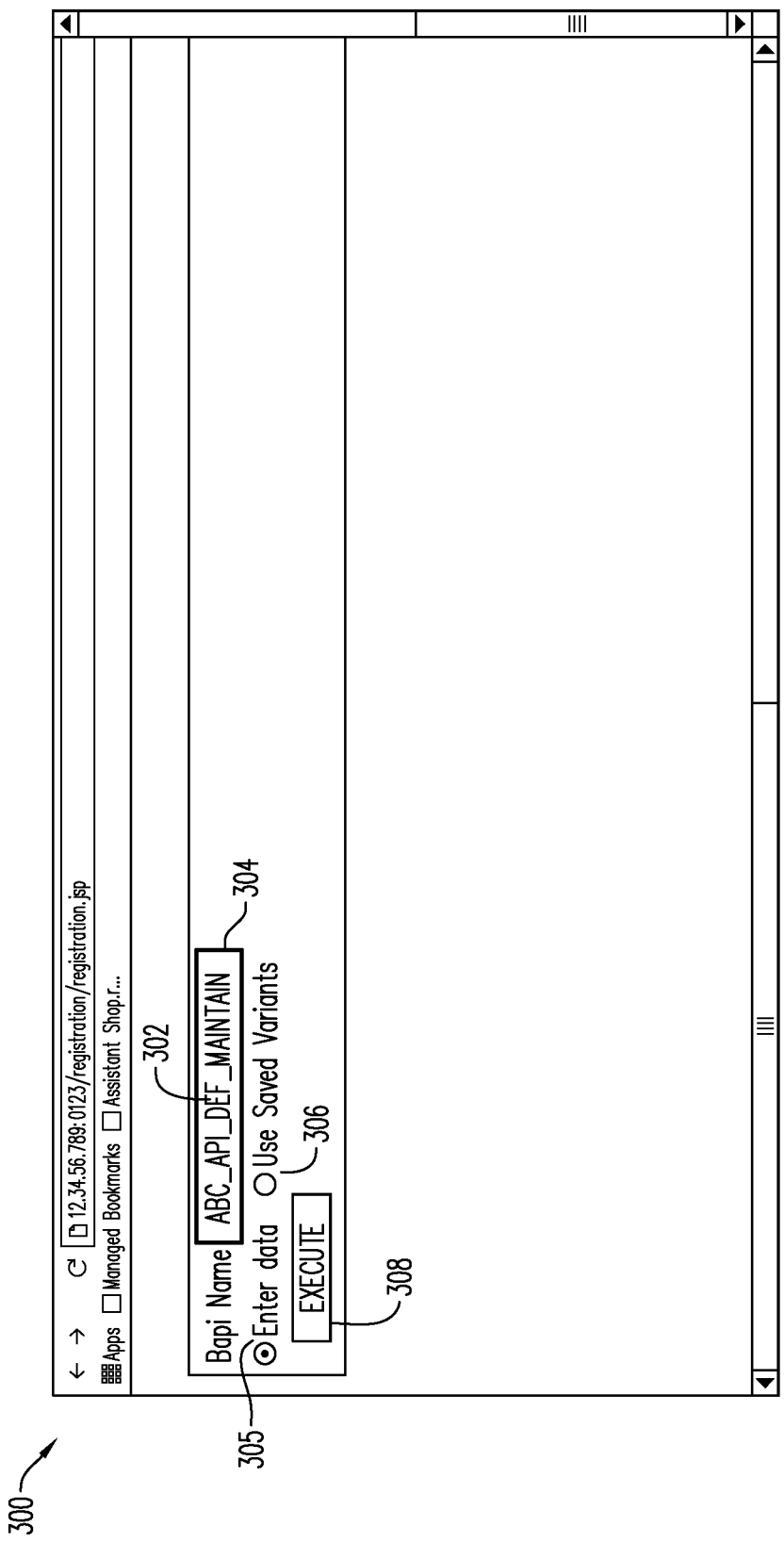
FIG. 3 is an outward view of a graphical interface according to some embodiments.
Figure 4:
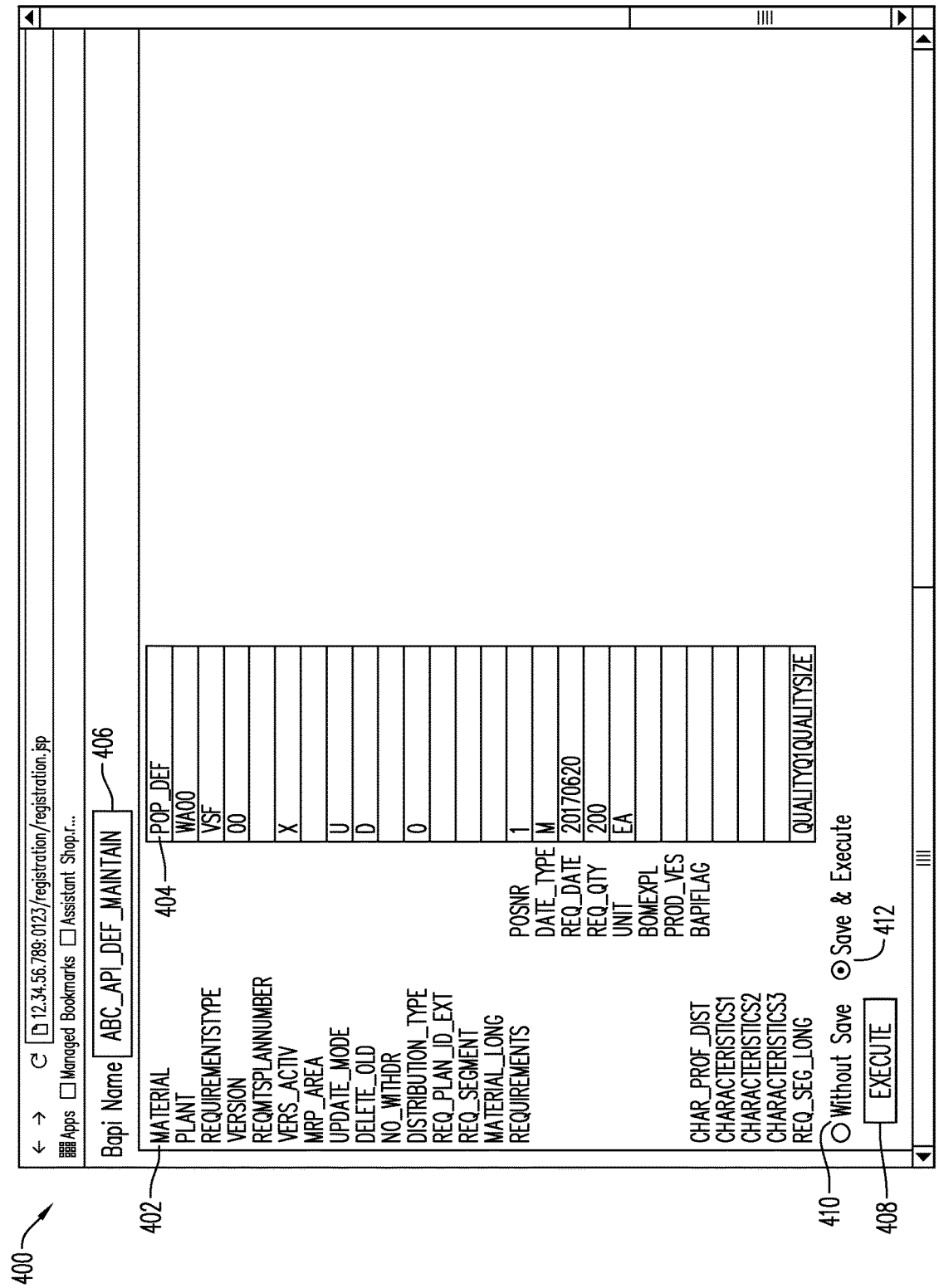
FIG. 4 is an outward view of a graphical interface according to some embodiments.

Initially, at S210, input 302 identifying the API used to test the code 116 is received. It is noted that while the API used in the examples featured herein is a BAPI, any suitable API may be used. As described above, the BAPI may include two or more fields that may include data values. These data values may be test values used by the system under test 102 during execution thereof in a test environment to determine how the system 102 is functioning in response to the test values. As shown in FIG. 3, after accessing the web app 107, a user interface 300 may be provided, including a BAPI name field 304 to receive the BAPI name input 302. In one or more embodiments the tester 114 may be provided with a drop-down menu of BAPI names to select from and/or may be provided with a "help" control that may provide the tester 114 with different options and/or menus to select the BAPI name.

The tester 114 may also be provided with the option to select "enter data" or "use saved variants" via a radio button 305, 306, respectively, or any other suitable indicator. After selecting the "enter data" radio button 305 or the "use saved variants" button 306, the tester 114 may execute their selection by selecting an "execute" control 308. In S212, it is determined whether the tester 114 selects the "enter data" radio button 305 or the "use saved variants" button 306. Then in S214, one or more parameters 402 may be displayed to the tester 114 via a user interface 400/600.

When it is determined the tester 114 selected the "enter data" radio button 305 in S212, the BAPI name input 302 is received by the code testing module 108. In one or more embodiments, the code testing module 108 includes a BAPI field extractor 122 and a variant injector 124. In one or more embodiments, the BAPI field extractor 122 and the variant injector 124 may use a middleware component service 126 (e.g., SAP Java Connector ("JCo")) to allow the BAPI field extractor 122 and variant injector 124 to communicate with the system under test 102, when different programming languages are used. The BAPI field extractor 122 may automatically extract the parameters (e.g., input field names 402/tables/structures) associated with the received BAPI name, and provide those parameters 402 to the web app 107, where they are displayed to the tester 114 via the user interface 400 (S214). The tester 114 may then input data values 404 in an input field 406 for each parameter name 402, for example. In one or more embodiments, the tester 114 may provide a valid input data set that completes less than all of the input fields 406 corresponding to the parameter field names 402. As used herein, "variant" may refer to the set of two or more data values 404 received in the input fields 406.

Figure 6A:
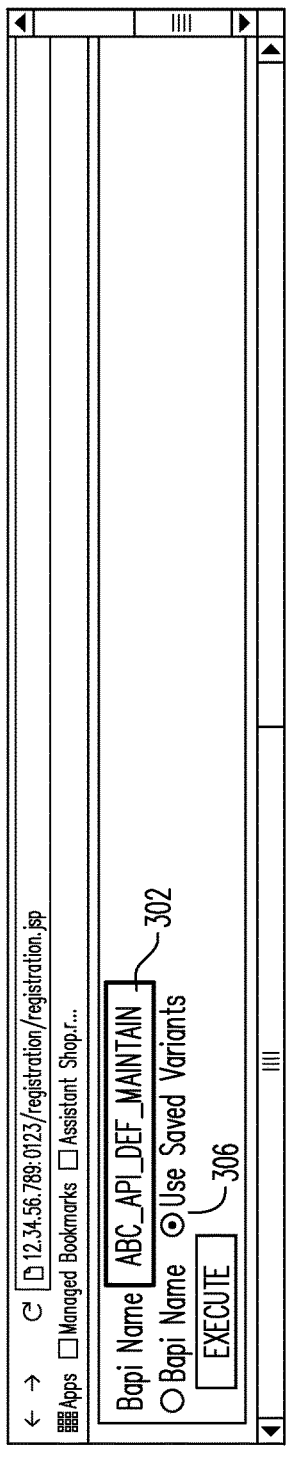
FIG. 6A is an outward view of a graphical interface according to some embodiments.
Figure 6B:
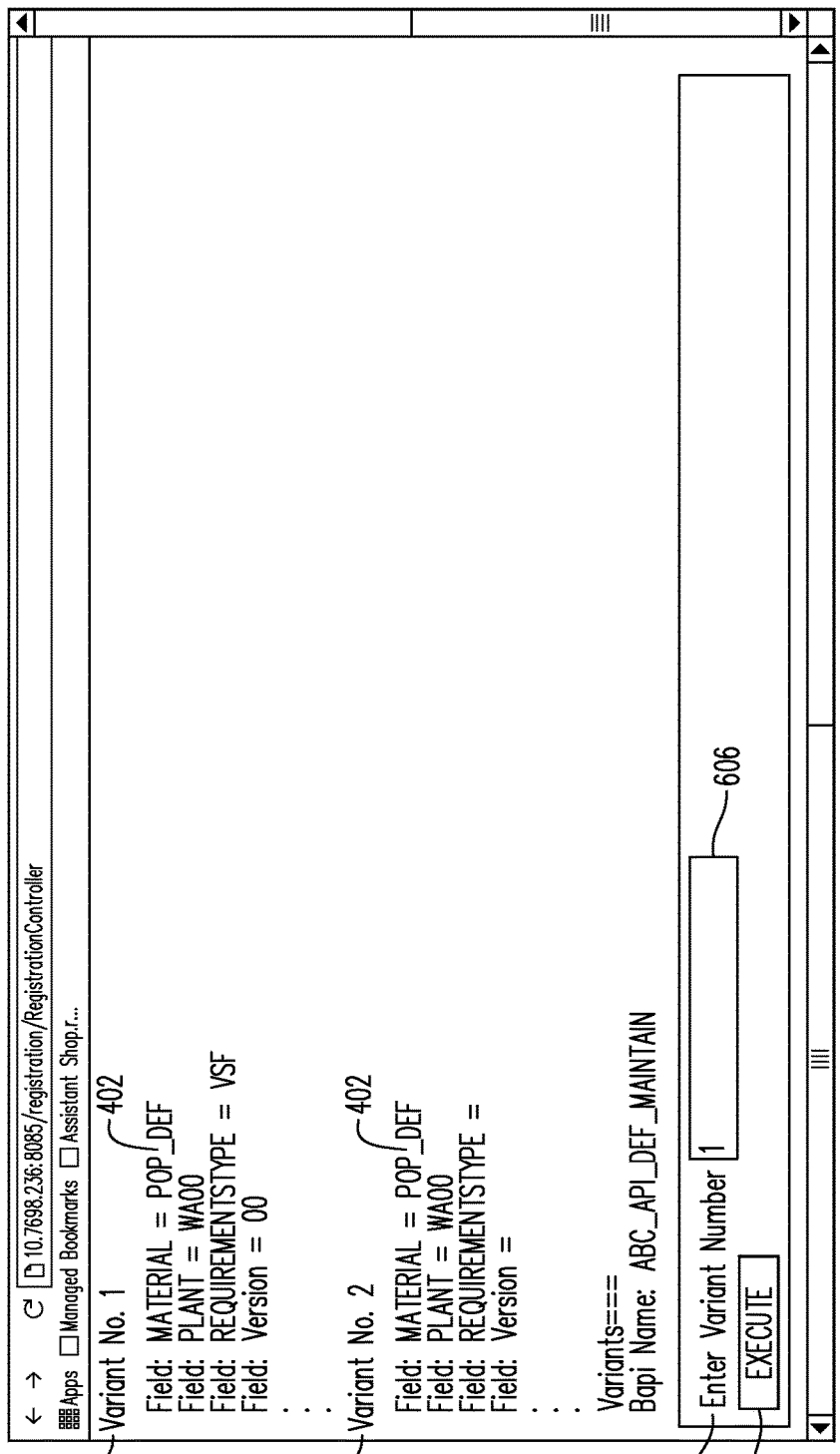
FIG. 6B is an outward view of a graphical interface according to some embodiments.

When it is determined the tester 114 selected the "Use Saved Variants" radio button 306 in S212 (FIG. 6A), the BAPI name input 302 is received by the code testing module 108. The code testing module 108 may then retrieve one or more saved variants 129 from the database 110. In one or more embodiments, the code testing module 108 may retrieve the one or more saved variants 129 via the multiple variant generation and handling module 120. The code testing module 108 may then return the one or more saved variants 129 for display to the tester 114 via the web app 107. As shown in FIG. 6B, the user interface 600 may display saved parameters associated with the BAPI name input 302. The saved variant may be displayed via the saved variant name 602, and may include the parameters associated with that saved variant and the parameter values 603. The tester 114 may then select one of the displayed variant names 602 for use in testing the code 116 of the system under test 102. In one or more embodiments, the user interface 600 may include an "Enter Variant Number" field name parameter 604 and corresponding data entry field 606 to receive the selected variant. The user interface 600 may also include an execute control 608 to execute the tester's selection. After the execute control 608 is selected, the tester 114 may be presented with the user interface 400 shown in FIG. 4 (S214), with the fields 406 already populated with the values from the selected saved variant. In one or more embodiments, the tester 114 may have the opportunity to change at least one of the values 603 from the selected saved variant and/or enter additional values in empty data input fields 406.

Turning back to the process 200, after one or more parameters 042 and any data values 404 of the variant are displayed to the tester 114, the tester 114 may then select, in S216, the execute control 408 to send the parameter and data values to the multiple variant generation and handling module 120. In one or more embodiments, the initial values input for the parameters may form an original variant ($V_o$). In one or more embodiments, the tester 114 may decide to select the execute control 408 without saving the parameter and data values, via selection of a "Without Save" control 410, or may decide to select the execute control 408 with saving the parameter and data values, via selection of a "Save & Execute" control 412. For example, if the tester wants the variant to be used by the multiple variant generation and handling module for later execute, the tester may save and execute.

Next, in S218, the multiple variant generation and handling module 120 computes and generates one or more variants 128 that may be used to test the code 116 in the system under test 102. In one or more embodiments, the multiple variant generation and handling module 120 may generate "n" number of combinations of sets of data in the form of "n" variants. For example, if the initial or original variant ($V_o$) includes five fields of data values, the multiple variant generation and handling module 120 may compute three additional variants for testing: $V_1$ with values in parameter fields 1-3, $V_2$ with values in fields 1, 3 and 5, and $V_3$ with values in fields 3-5. As will be described further below with respect to FIGS. 7 and 8, the values in the generated variant fields may be the same as, or different from, the values in the original variant, with respect to at least one of absolute value, and value type. The variants 128 may then be received by the system under test 102 via the variant injector 124 in S220.

Then in S222, the code for which the BAPI acts as an interface is executed using the injected variants 128. In one or more embodiments, after the variant injector 124 receives the variants 128 from the multiple variant generation and handling module 120, the variant injector 124 may communicate with the system under test 102 and inject the variants into the BAPI as values to be used during execution of the system under test 102. After execution, the code testing module 108 may generate a log 502 (FIG. 5) via the log service 118 in S222. In one or more embodiments, the log 502 may define a record of the executed CODE, including the variant used, and how the injected variant performed in the executed CODE.

Figure 5:
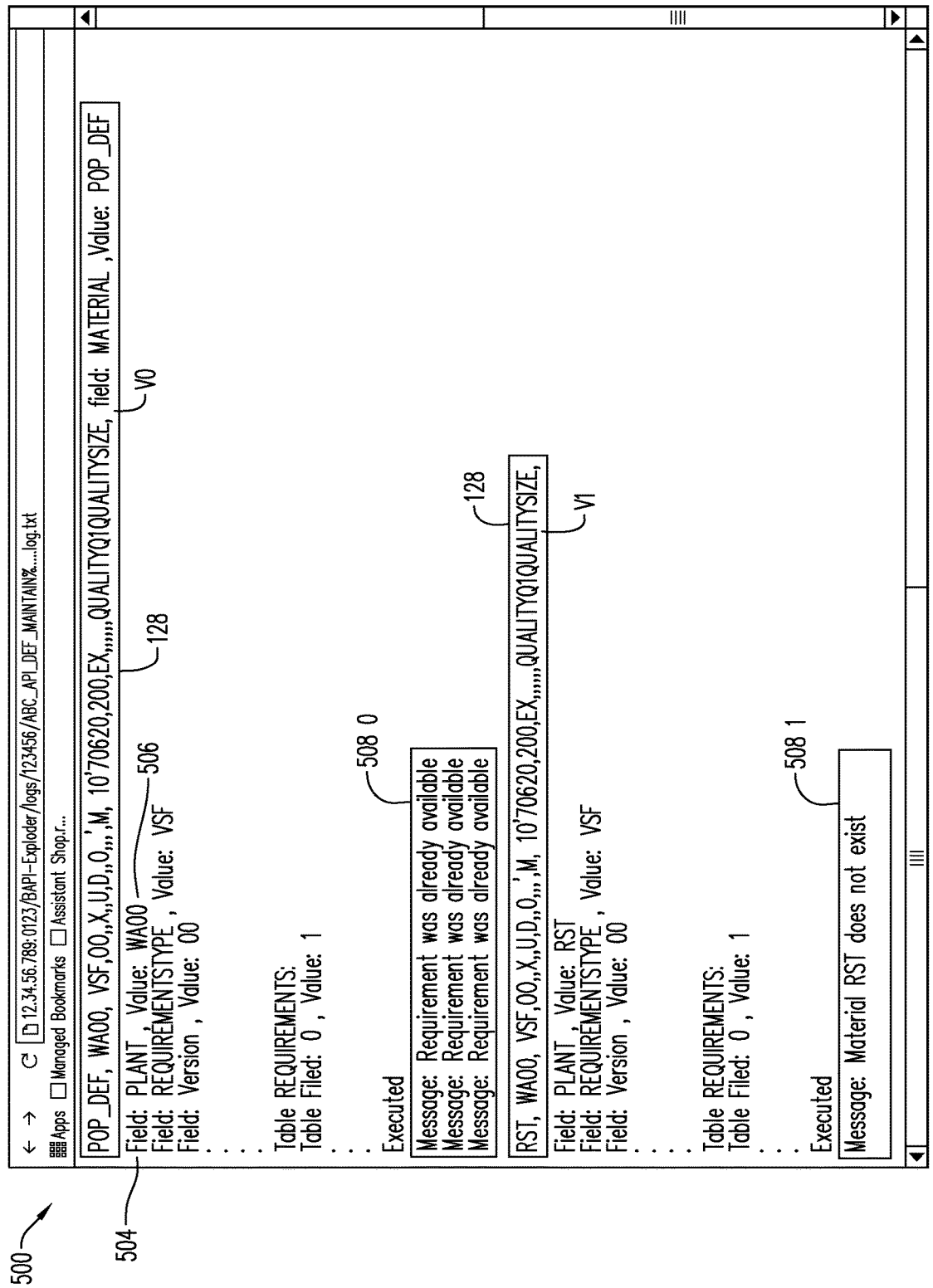
FIG. 5 is an outward view of a graphical interface according to some embodiments.

As a non-exhaustive example FIG. 5 provides a user interface 500 displaying a log 502 of the executed code using the injected variants. The log 502 may include the variant 128, listing the fields 504 and values 506 that were tested in those fields. For example, the original variant ($V_o$) may include for the "PLANT" field 504, a value of "WA00" 506; for the "REQUIREMENTS TYPE" field 504, a value of "VSF" 504; and for the "VERSION" field 504 a value of "00" 506. The log 502 may also include an output section 508, for each executed variant. The output section 508 may be a reaction of the code to the variants being given, and may indicate whether the code/application performed as intended using the variant or whether any bugs were found. For example, for the original variant, the output section 508 includes a message that indicates "Requirement was already available," which may be a validation response meaning that the code performed as expected. Continuing with the log 502 shown in FIG. 5, another variant, $V_1$, was used in the execution of the code. The other variant $V_1$ may include for the "PLANT" field 504, a value of "RST" 506; for the "REQUIREMENTS TYPE" field 504, a value of "VSF" 506; and for the "VERSION" field 504 a value of "00" 506. The output section $508_1$ for the other variant $V_1$ includes a message that indicates "Material RST does not exist." The message is a validation response, which is a reaction of the code to the various data inputs (positive or negative). The validation response may either be as expected or in the case of software bug/incorrect as unexpected, which may be discovered through testing. It is noted that testing may include multiple iterations or cycles of executing the system under test, and each iteration may include a different variant. The more iterations executed with different variants, the more lines of code that may be tested. With respect to the two preceding non-exhaustive examples, varied test value injection may trigger various lines of code that is written for various "validations, error handlings, exception handlings, etc.," thereby touching more lines of code.

Figure 7:
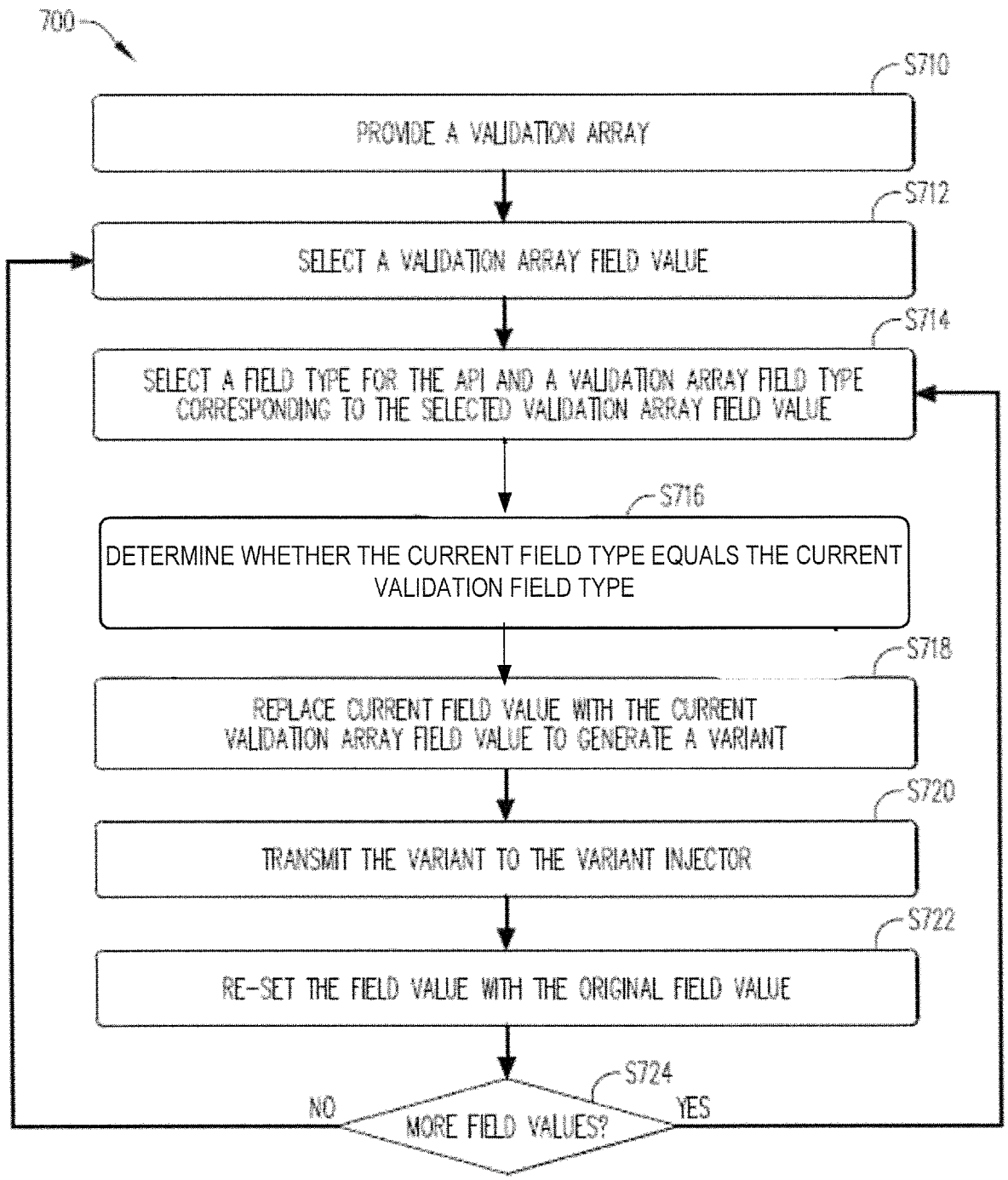
FIG. 7 is a flow diagram of a process according to some embodiments.
Figure 8:
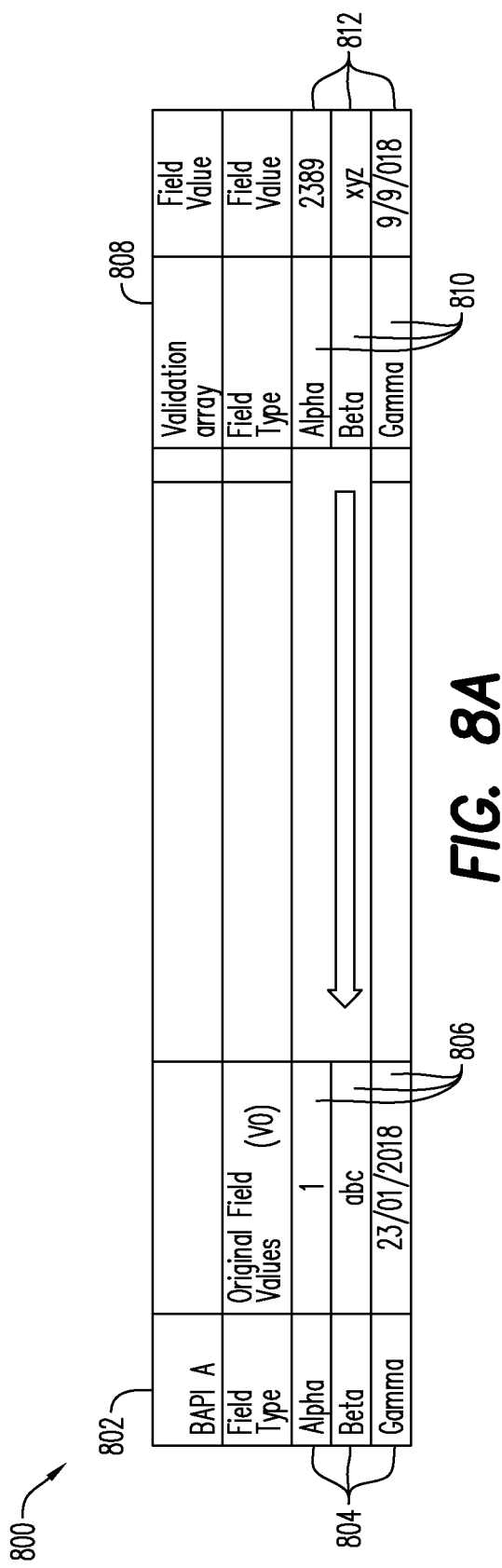
FIGS. 8A-8D are a non-exhaustive example according to some embodiments.

Turning to FIGS. 7-8A-D, a process 700 for generating one or more variants 128 via the multiple variant generation and handling module 120 is provided in accordance with one or more embodiments.

Initially, at S710, a validation array 808 is provided. The validation array 808 may include possible combinations of positive and negative inputs. The validation array 808 may be grouped explicitly on the basis of Field Type, thus removing the redundancy of duplicate state checks. In one or more embodiments, redundancy may be checked by inputting mismatched data types in a particular field a limited number of times (e.g., one time), because if the same mismatched data type is repeatedly injected multiple times, the same set of code is touched repeatedly, thus making the entire process inefficient. For example, the validation array may contain multiple date formats (e.g., MMDDYYYY, YYYYDDMM, etc.). In the case a field type is date, it may make sense to replace it with all date format. However, if the type is character (e.g., name), replacing it only with a date format once may be sufficient. The possible inputs in the validation array 808 may include all formats for all field types, e.g., alpha, numeric, special character, date format, etc. Other formats may be used. It is noted that the injection of multiple input field values may enable both positive and negative testing of the code. As used herein, a "positive test" may refer to when the input fields include values that are correct combinations of various permutations. As used herein, a "negative test" may refer to when the input fields include a combination that may trigger various exception and error handling code. As used herein, the term "swapping" may refer to the injection of multiple input field values, as described further below. In one or more embodiments, a negative test may be executed whenever a corresponding field type is swapped with a value that does not correspond to its field type (e.g., field type CHAR is inputted with Numeric), as further described below.

As a non-exhaustive example, FIG. 8A provides a chart 800 including the original variant associated with the BAPI 802, the variant including the field type 804 and field values 806. The chart 800 may also include the validation array 808. The validation array 808 may include one or more validation array field types 810 and one or more validation array field values 812.

In S712, the validation array field value 812 is selected. For the example shown in FIG. 8A, the selected validation array field value 812 is "23896."

Then in S714, for the selected validation array field value 812, the multiple variant generation and handling module 120 selects a field type 804 for the BAPI 802 and a validation array field type 810 corresponding to the validation array field value 812. The selected field type and selected validation array field type may be referred to as the "current" field type and "current" validation array field type, respectively, as these fields types are "currently" under analysis. Next, in S716, the multiple variant generation and handling module 120 determines whether the current field type 804 is the same as the current validation array field type 810.

If it is determined in S716 that the current variant field type 804 is the same as the current validation array field type 810, the following will be a positive test. If it is determined in S716 that the current variant field type 804 is not the same as the current validation array filed type 810, the following will be a negative test. After the determination in S716, the current field value 806 is replaced with the current validation array field value 812 in S718 (FIG. 8B).

Continuing with the example shown in FIG. 8A, in S714, the field type 804 "alpha," associated with field value 806 "1" is selected and the validation array field type 810 "alpha," associated with validation array field value 812 "23896", is selected. In S716, it is determined that field type 804 "alpha" is the same as validation array field type "alpha." Then in S718, the field value "1" 806 in the BAPI 802 is replaced or swapped with the validation array field value 812 "23896", thereby generating a first variant $V_1$ (FIG. 8B).

Next, the generated variant $V_1$ is transmitted to the variant injector 124 in S720. In one or more embodiments, the generated first variant $V_1$ may then be injected to the code 116 via the BAPI, the code is executed, and a log is generated, as described above with respect to S220-S222 and FIG. 2.

After transmission of the generated variant $V_1$, the multiple variant generation and handling module 120 re-sets the field value 806 with the original field value in S722. Then, the process 700 proceeds to S724 and it is determined whether there are more field values 806 to test. If, in S724 it is determined there are more field values to test for the given BAPI 802, the process 700 proceeds to S714. If it is determined in S724 that there are no more field values to test for the given BAPI, the process 700 proceeds to S712, and a next validation array field value 812 is selected. In one or more embodiments, the next value may be selected via a counter, or some other mechanism. In one or more embodiments, the process 700 may continue until the multiple variant generation and handling module 120 has selected all of the validation array field values 812.

Continuing with the example shown in FIG. 8C, the multiple variant generation and handling module 120 has re-set the field value 806 "23896" for field type 804 "alpha" with the original field value 806 "1," per S722, determined there are more field values 806 to test in S724, and then returned to S714 to test the selected validation array field value 812 "23896" in the field value 806 associated with the next field type per S714. In the example shown herein, the next field type 804 is "Beta," which is not the same as the validation array field type 810 "Alpha." However, the validation array field value 812 "23896" may be swapped with the original field value "abc," to execute a negative testing scenario.

Continuing with the example shown in FIG. 8D, after several variant generations, it is determined in S724 there are no more field values 806 to test, and the process has returned to S712 to select the next validation array field value 812 "xyz." As "xyz" is associated with validation array field type 810 "Beta," and it is swapped with a BAPI field type 804 "Alpha," this iteration will provide a variant for negative testing.

Figure 9:
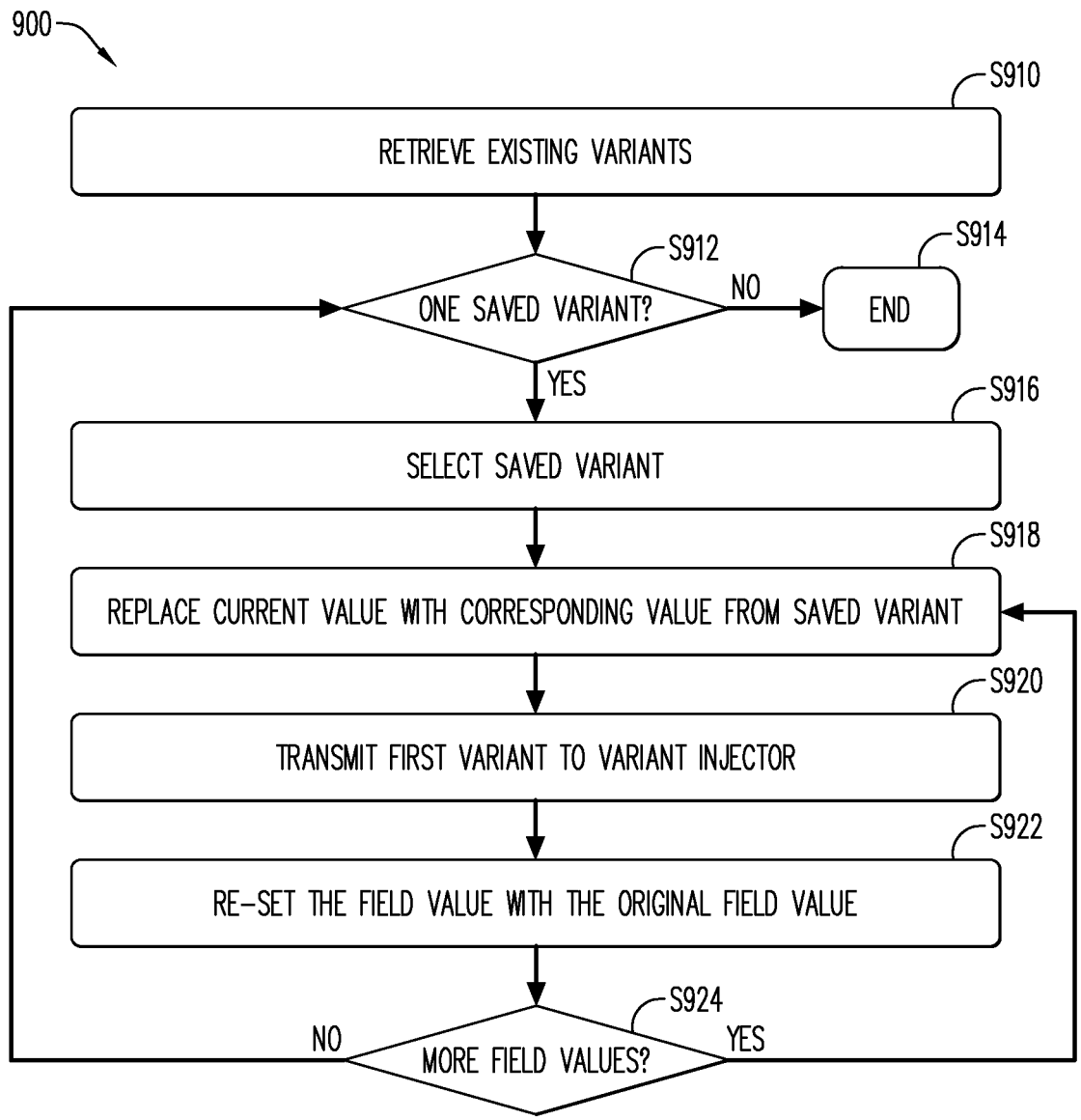
FIG. 9 is a flow diagram of a process according to some embodiments.

Turning to FIG. 9, a process 900 for generating variants 128 is provided according to one or more embodiments. In one or more embodiments, the multiple variant generation and handling module 120 may generate variants 128 based on the original variant ($V_o$) and one or more already existing variants 129 that have been saved in the database 110. It is noted that a variant may be saved (existing variant) as a tester 114 may want to specifically test those values (e.g., may be the system typically gives problems with them and may need to repeatedly test with these values).

Initially, at S910, all of the existing variants 129 associated with the BAPI may be retrieved by the multiple variant generation and handling module 120 from the database 110. Next in S912 it is determined whether at least one saved variant is returned. If at least one saved variant is not returned, the process ends in S914. If it is determined in S912 that at least one saved variant is returned, a saved variant 129 is selected in S916. After the saved variant 129 is selected, a current field value of the original variant ($V_o$) may be replaced by the corresponding field value of the existing/saved variant 129 in S918, thereby generating a first variant ($V_1$). Then the first variant is transmitted to the variant injector 124 in S920. In one or more embodiments, the generated first variant $V_1$ may then be injected to the code 116 via the BAPI, the code is executed, and a log is generated, as described above with respect to S220-S222 and FIG. 2.

After transmission of the generated variant $V_1$, the multiple variant generation and handling module 120 re-sets the field value with the original field value in S922. Then, the process 900 proceeds to S924 and it is determined whether there are more field values to test. If, in S924 it is determined there are more values in the saved variant 129 with which to generate variants, the process 900 proceeds to S918. If it is determined in S924 that there are no more field values to test for the saved variant 129, the process 900 proceeds to S912, it is determined whether more saved variants exist 129, and if so, the next variant is selected. In one or more embodiments, the next value may be selected via a counter, or some other mechanism. In one or more embodiments, the process 900 may continue until the multiple variant generation and handling module 120 has selected all of the values from all of the saved variants 129.

Figure 10:
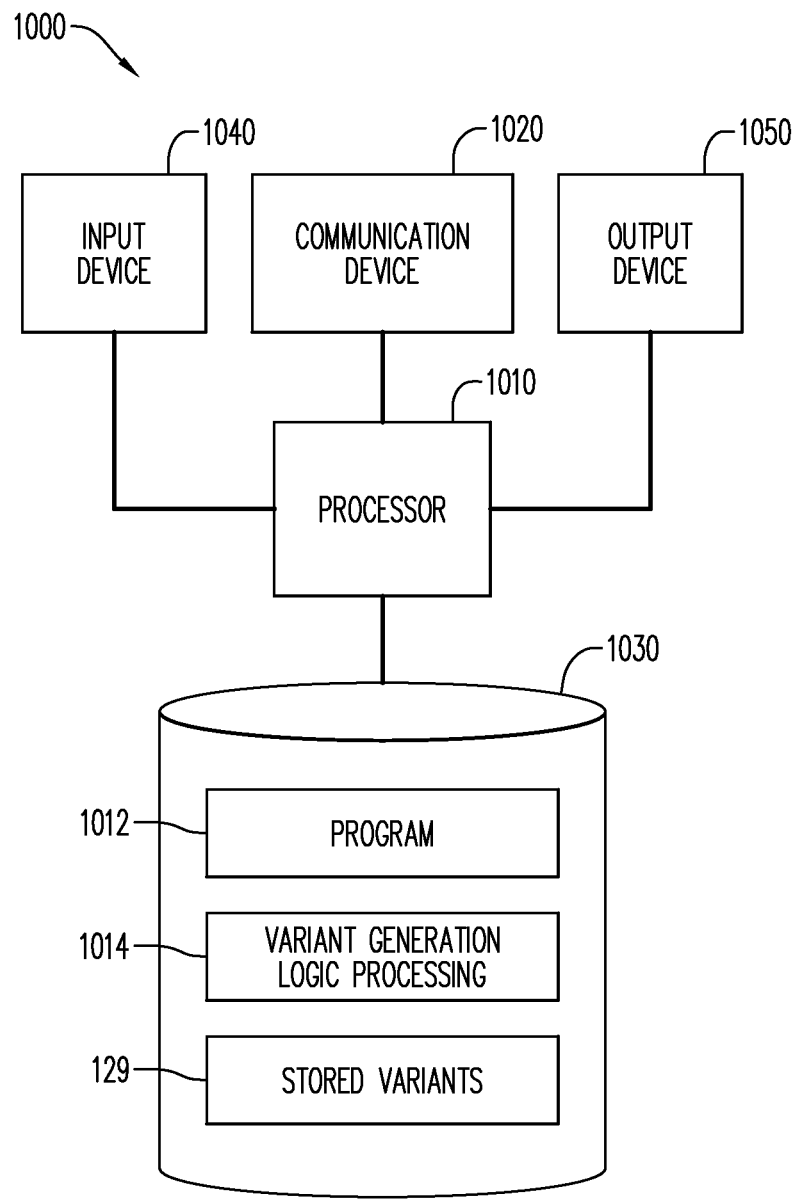
FIG. 10 is a block diagram of a system according to some embodiments.

FIG. 10 is a block diagram of apparatus 1000 according to some embodiments. Apparatus 1000 may comprise a general- or special-purpose computing apparatus and may execute program code to perform any of the functions described herein. Apparatus 1000 may comprise an implementation of one or more elements of system 100. Apparatus 1000 may include other unshown elements according to some embodiments.

Apparatus 1000 includes variant generation processor 1010 operatively coupled to communication device 1020, data storage device 1030, one or more input devices 1040, one or more output devices 1050 and memory 1060. Communication device 1020 may facilitate communication with external devices, such as application server 104. Input device(s) 1040 may comprise, for example, a keyboard, a keypad, a mouse or other pointing device, a microphone, knob or a switch, an infra-red (IR) port, a docking station, and/or a touch screen. Input device(s) 1040 may be used, for example, to manipulate graphical user interfaces and to input information into apparatus 1000. Output device(s) 1050 may comprise, for example, a display (e.g., a display screen) a speaker, and/or a printer.

Data storage device/memory 1030 may comprise any device, including combinations of magnetic storage devices (e.g., magnetic tape, hard disk drives and flash memory), optical storage devices, Read Only Memory (ROM) devices, Random Access Memory (RAM) etc.

The storage device 1030 stores a program 1012 and/or variant generation platform logic 1014 for controlling the processor 1010. The processor 1010 performs instructions of the programs 1012, 1014, and thereby operates in accordance with any of the embodiments described herein, including but not limited to processes 200/700/900.

The programs 1012, 1014 may be stored in a compressed, uncompiled and/or encrypted format. The programs 1012, 1014 may furthermore include other program elements, such as an operating system, a database management system, and/or device drivers used by the processor 1010 to interface with peripheral devices.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable non-transitory media. Such media non-transitory media may include, for example, a fixed disk, a floppy disk, a CD-ROM, a DVD-ROM, a Flash drive, magnetic tape, and solid-state RAM or ROM storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A system comprising:
   a display;
   at least one application programming interface (API) including one or more parameters, wherein the API injects values into code of a system under test;
   a validation array including candidates of positive and negative inputs to one or more variants;
   a code testing module including a multiple variant generation and handling module; and
   a code testing processor in communication with the code testing module and operative to execute processor-executable process steps to cause the system to:
   receive data identifying a first API of the at least one API;
   display two or more parameters associated with the API, wherein the two or more parameters include a first variant that is a set of two or more data values;
   generate, with the multiple variant generation and handling module, a second variant based on a swap of a first data value in the first variant with a first input value from the validation array;
   generate, with the multiple variant generation and handling module, a third variant based on a swap of a second data value in the first variant with the first input value from the validation array;
   receive the generated variants at a variant injector;
   inject the generated variants into the code via the API; and
   execute the code with the injected generated variants.

2. The system of claim 1, wherein each value in the set is input as a value into the executed code.

3. The system of claim 1, wherein the received data is a name of the API.

4. The system of claim 1, wherein the code testing module further comprises a field extractor.

5. The system of claim 4, further comprising processor-executable process steps to cause the system to:
   extract, by the field extractor, the one or more parameters of the API.

6. The system of claim 5, wherein displaying one or more parameters further comprises processor-executable process steps to cause the system to:
   display an input field associated with each parameter; and
   receive a value in one or more of the input fields.

7. The system of claim 1, wherein generation of the one or more variants further comprises processor executable process steps to cause the system to:
   replace values associated with the one or more parameters with values in a validation array; and
   generate the variants based on the replaced values.

8. The system of claim 1, wherein generation of the variants further comprises processor executable process steps to cause the system to:
   replace values associated with the one or more parameters with values from a saved variant; and
   generate the variants based on values from the saved variant, wherein the saved variant is different from the generated variant.

9. A computer-implemented method comprising:
   providing a validation array including candidates of positive and negative inputs to one or more variants;
   receiving data identifying a first application programming interface (API) of at least one API, wherein the API injects values into a code of a system under test;
   displaying two or more parameters associated with the API, wherein the two or more parameters include a first variant that is a set of two or more data values;
   generating, with a multiple variant generation and handling module, a second variant based on a swap of a first data value in the first variant with a first input value from the validation array;
   generating, with the multiple variant generation and handling module, a third variant based on a swap of a second data value in the first variant with the first input value form the validation array;
   receiving the generated variants at a variant injector;
   injecting the generated variants into the code via the API; and
   executing the code with the injected generated variants.

10. The method of claim 9, wherein the received data is a name of the API.

11. The method of claim 9, further comprising:
    extracting, by a field extractor of the code testing module, the one or more parameters of the API.

12. The method of claim 11, wherein displaying one or more parameters further comprises:
    displaying an input field associated with each parameter; and
    receiving a value in one or more of the input fields.

13. The method of claim 9, wherein generating the one or more variants further comprises:
    replacing values associated with the one or more parameters with values in a validation array; and
    generating the variants based on the replaced values.

14. The method of claim 9, wherein generating the variants further comprises:
    replacing values associated with the one or more parameters with values from a saved variant; and
    generating the variants based on values from the saved variant, wherein the saved variant is different from the generated variant.

15. A non-transitory computer-readable medium storing program code, the program code executable by a computer system to cause the computer system to:
    provide a validation array including candidates of positive and negative inputs to one or more variants;
    receive data identifying a first Application Programming Interface (API) of at least one API, wherein the API injects values into a code of a system under test;
    display two or more parameters associated with the API, wherein the two or more parameters include a first variant that is a set of two or more data values;
    generate, with a multiple variant generation and handling module, a second variant based on a swap of a first data value in the first variant with a first input value from the validation array;
    generate, with the multiple variant generation and handling module, a third variant based on a swap of a second data value in the first variant with the first input value from the validation array;
    receive the generated variants at a variant injector;
    inject the generated variants into the code via the API; and
    execute the code with the injected generated variants.

16. The medium of claim 15, wherein each value in the set is input as a value into the executed code.

17. The medium of claim 15, further comprising program code executable by the computer system to cause the system to:
    extract, by a field extractor, the one or more parameters of the API.

18. The medium of claim 17, wherein displaying one or more parameters further comprises program code executable by the computer system to cause the system to:
   display an input field associated with each parameter; and
   receive a value in one or more of the input fields.

19. The medium of claim 15, wherein generation of the one or more variants further comprises program code executable by the computer system to cause the system to:
   replace values associated with the one or more parameters with values in a validation array; and
   generate the variants based on the replaced values.

20. The medium of claim 15, wherein generation of the variants further comprises program code executable by the computer system to cause the system to:
   replace values associated with the one or more parameters with values from a saved variant; and
   generate the variants based on values from the saved variant, wherein the saved variant is different from the generated variant.

* * * * *